United States Patent [19]

Arai et al.

[11] Patent Number: 5,026,509

[45] Date of Patent: Jun. 25, 1991

[54] TRACKING CONTROL SYSTEM FOR INFORMATION REPRODUCING APPARATUS

[75] Inventors: Kazuo Arai, Hirakata; Shinji Okada, Uji, both of Japan

[73] Assignee: Matsushita Electric Industrial Co., Ltd., Osaka, Japan

[21] Appl. No.: 146,603

[22] Filed: Jan. 19, 1988

[30] Foreign Application Priority Data

Jan. 19, 1987 [JP] Japan .................................. 62-9304

[51] Int. Cl.$^5$ ...................... G11B 5/584; H03K 5/153
[52] U.S. Cl. ............................... 360/77.15; 360/77.14; 307/362; 307/353
[58] Field of Search .................... 360/77.14, 77.15, 70, 360/77.17, 73.04, 73.09–73.14, 37.1, 18, 77.01–77.13; 358/17, 20, 319, 188, 174, 176, 145, 147; 307/362, 353, 350; 328/146, 147, 151

[56] References Cited

U.S. PATENT DOCUMENTS 4,420,778  12/1983  Sakamoto .......................... 360/77.17
4,843,493  6/1989  Furuhata et al. .................. 360/77.15

OTHER PUBLICATIONS

"Servo Technology of R-DAT", Akihiko Hitomi et al., IEEE Transactions on Consumer Electronics, vol. CE-32, No. 3, Aug. 1986, pp. 425 to 431.

Primary Examiner—Aristotelis M. Psitos
Assistant Examiner—Steven R. Garland
Attorney, Agent, or Firm—Wenderoth, Lind & Ponack

[57] ABSTRACT

A tracking control system for an information reproducing apparatus employs a recording medium which has recorded therein a tracking signal including a pilot signal and a synchronizing signal. The tracking control system includes a synchronizing signal detection circuit which detects the synchronizing signal, a timing circuit which outputs a pulse delayed from a timing when the synchronizing signal has detected the synchronizing signal, an amplitude detecting circuit which obtains the amplitude of the pilot signal, a capacitor whose one terminal is connected to the amplitude detection circuit, a switching circuit whose one terminal is connected to the other terminal of the capacitor and whose other terminal thereof is fixed at a constant electrical potential, a switching control circuit which controls the switching of the switching circuit upon receiving the output of the synchronizing signal detection circuit, a sample/hold circuit which holds, upon receiving the pulse from the timing circuit, a voltage appearing at the connection point of the capacitor and the switching circuit. This held voltage is used as a tracking error signal.

12 Claims, 7 Drawing Sheets

TRACKING CONTROL SYSTEM FOR INFORMATION REPRODUCING APPARATUS

BACKGROUND OF THE INVENTION

1. Field of the Invention

This invention relates to an information reproducing apparatus such as a digital audio tape recorder (hereafter called a DAT), a video tape recorder (hereafter called a VTR), and a compact disk player (hereafter called a CD player), which reproduces information recorded in tracks formed on a recording medium, and more specifically to a tracking control system used to control the position of a reproducing head relative to a track.

2. Description of the Prior Art

In a rotary head type DAT, parallel tracks are formed diagonally on a magnetic tape, and at a prescribed position on each track an ATF (automatic track finding) signal is recorded which is used to secure tracking of the reproducing head during reproduction (an operation to control a reproducing head to keep running on the center of a track is called "tracking"). A system in which the ATF signal is used to secure tracking is disclosed in "SERVO TECHNOLOGY OF R-DAT" AKIHIKO HITOMI et al, IEEE Transactions on Consumer Electronics, Vol, CE-32, No. 3, August 1986, PP425 to 431.

The ATF signal basically consists of pilot signals for detecting by crosstalk a relative position of the head to a track and a synchronizing signal for sampling and holding the pilot signals. More specifically, in any three successive tracks, providing that a head is scanning the center track of the three tracks a pilot signal recorded on one side track of the three tracks and a pilot signal recorded on the other side track of the three tracks are positioned to be shifted from each other in the track scanning direction so that they are reproduced by the head at different timings from each other. That is, one of the two pilot signals is reproduced earlier, and the other later. Note that the gap length of the head is larger than the width of each track so that the two pilot signals on the two side tracks adjacent to the center track are reproduced as crosstalk signals. A synchronizing signal recorded on the center track is positioned to overlap the earlier reproduced pilot signal in the head scanning direction.

However, since this system uses two sample/hold circuits and a subtracter, the size of the circuitry becomes large.

SUMMARY OF THE INVENTION

An object of the present invention is to provide a tracking control system having a simple construction which is capable of obtaining a tracking error signal of the reproducing head and securely accomplishing the tracking of the reproducing head by using such a tracking error signal.

In order to achieve the above object, the present invention employs a recording medium having recorded therein such a pilot signal that is sequentially reproduced by a signal pickup head and the amplitude of the reproduced pilot signal changes according to the amount of a tracking error of the head and a synchronizing signal for detecting a part of the pilot signal to be first reproduced. A tracking control system of the present invention comprises:

a pickup head for reading signals from the recording medium;

a synchronizing signal detection circuit for detecting the synchronizing signal recorded in a track on the recording medium from an output of the pickup head;

a timing circuit which outputs a pulse a predetermined time after the time when the synchronizing signal detection circuit has detected the synchronizing signal;

an amplitude detecting circuit for detecting the amplitude of the pilot signal;

a capacitor, one terminal of which is connected to an output terminal of the amplitude detecting circuit;

a switching circuit, one terminal of which is connected to the other terminal of the capacitor, the other terminal of the switching circuit being fixed at a fixed electrical potential;

a switching control circuit which controls switching of the switching circuit in response to an output of the synchronizing signal detection circuit;

a sample/hold circuit which is connected at its voltage input terminal to a connection points of the capacitor and the switching circuit, and which samples and holds a voltage appearing at the voltage input terminal in response to the pulse outputted from the timing circuit; and a tracking means which controls the position of the pickup head relative to the recording medium according to an output of the sample/hold circuit.

When this system is applied to DAT, for example, a first sample pulse outputted when the synchronizing signal is detected is used to close the switching circuit to store in the capacitor a difference between an amplitude of a pilot signal and the electrical potential of the other terminal of the switch. After the predetermined time, a difference between an amplitude of a pilot signal appearing at the terminal of the capacitor connected to the switching circuit and the voltage stored in the capacitor is sampled and held by the sample/hold circuit in response to a second sample pulse from the timing circuit. Thus, a difference between amplitudes of the pilot signals recorded on two adjacent tracks can be obtained. The output of the sample/hold circuit represents the position of the head center relative to the track center. It is possible to secure the tracking of the head by controlling the speed of the magnetic tape so as to eliminate the output signal of the sample/hold circuit.

Therefore, according to the present invention, it becomes possible to cause the pickup head for reproduction to track properly on the track formed on a recording medium using a simple constitution as compared with that of the prior art.

DESCRIPTION OF THE PREFERRED EMBODIMENTS

Figure 1:
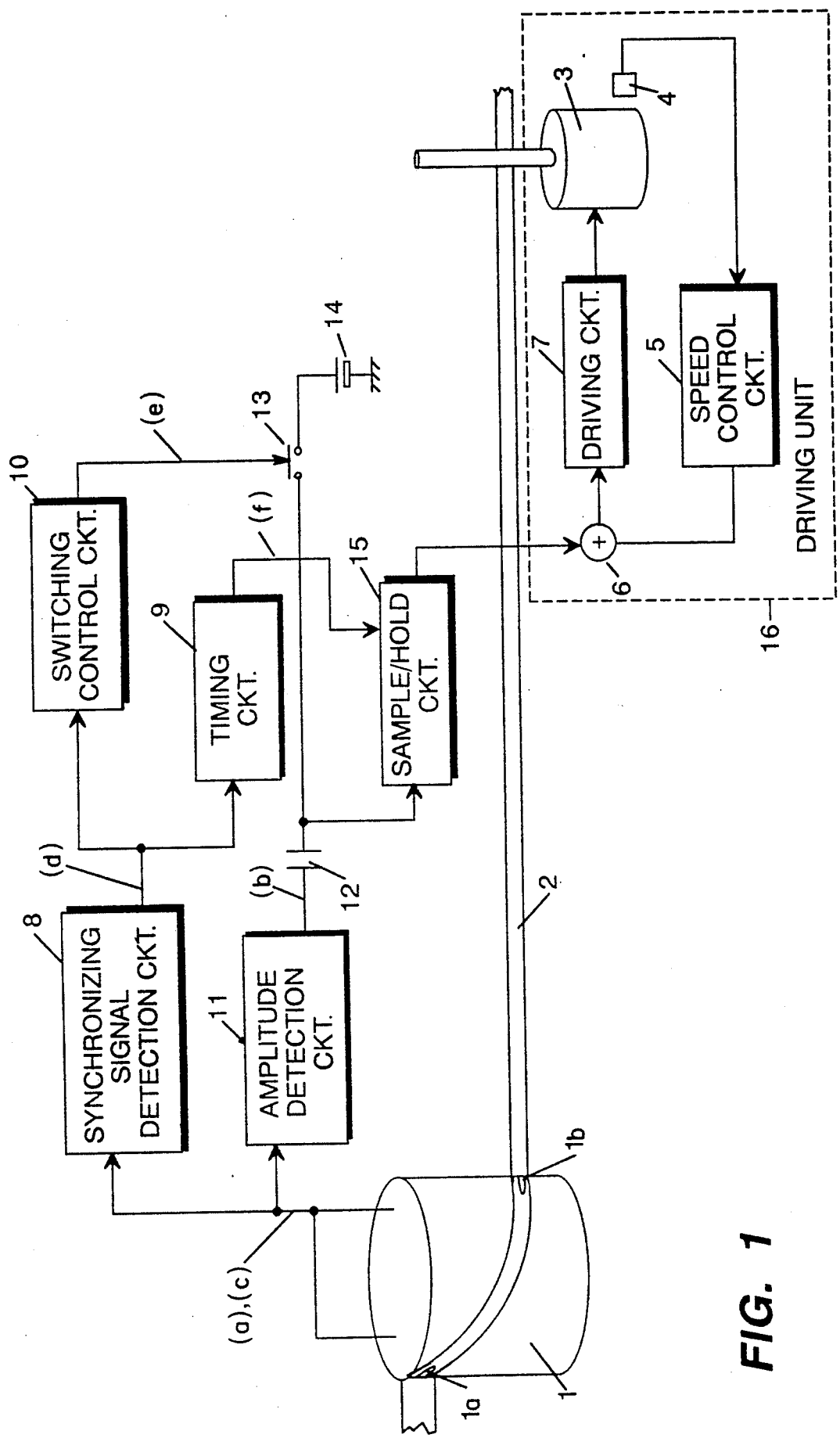
FIG. 1 is a block diagram of a first embodiment according to the present invention.
Figure 2A:
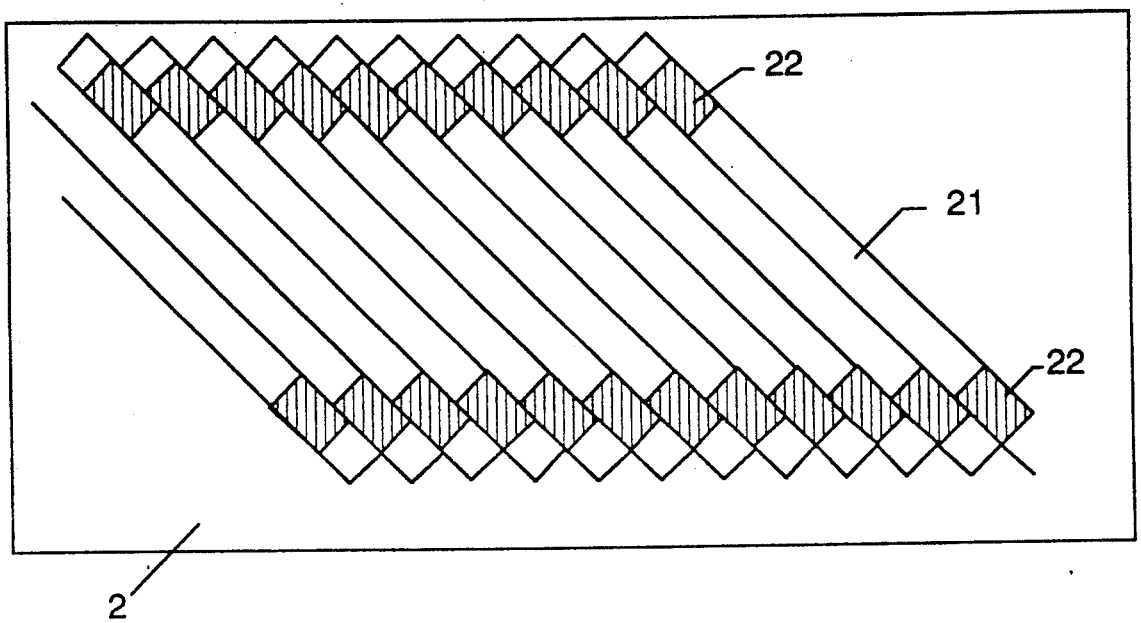
FIGS. 2(A) and 2(B) show an exemplary recording patterns of the recording medium used in the system according to the present invention.
Figure 2B:
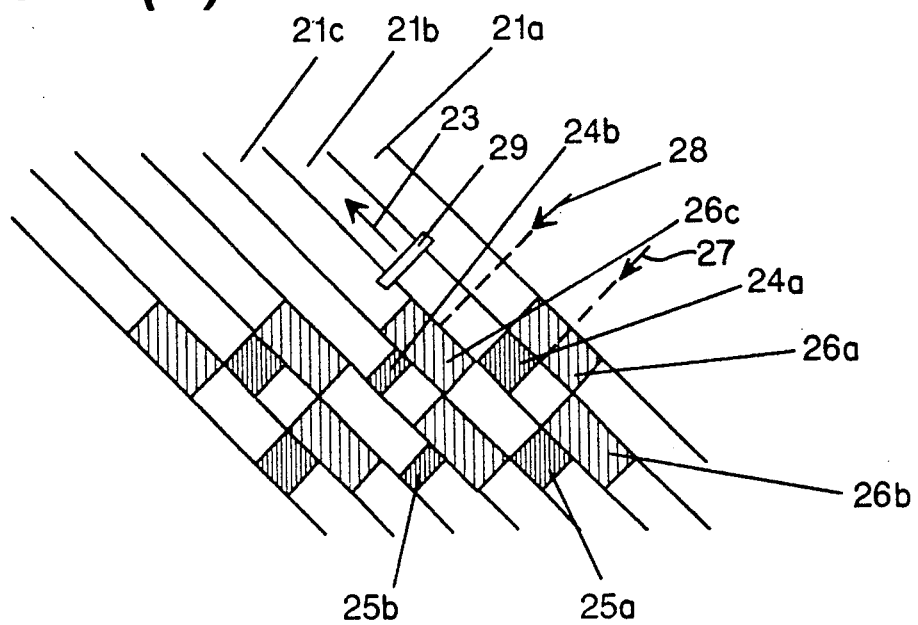
Figure 3:
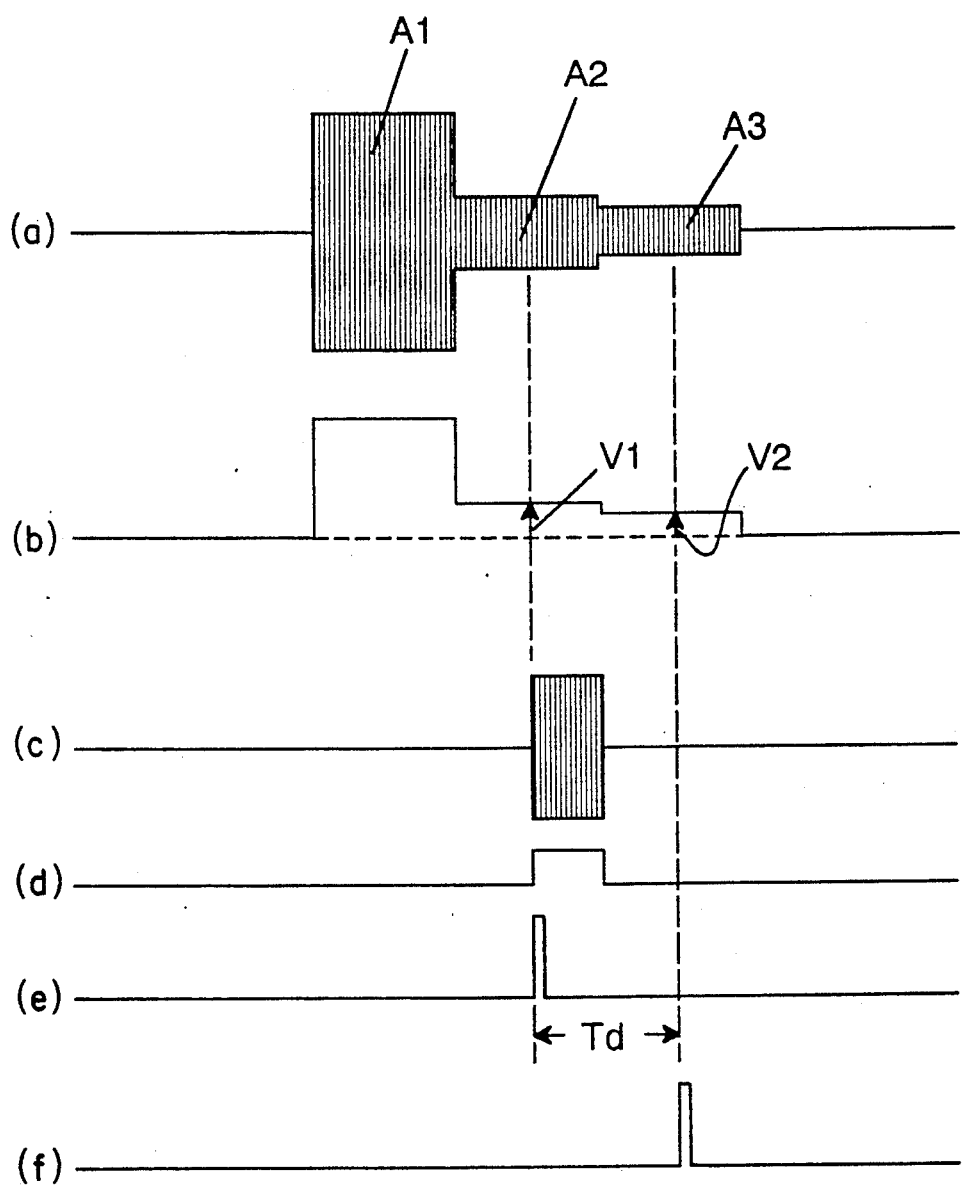
FIG. 3, parts $(a)$-$(f)$, is an operational waveform diagram of the first embodiment.

FIG. 1 is a block diagram showing an embodiment of tracking control system according to the present invention; FIGS. 2(A) and 2(B) are diagrams wherein a magnetic tape is selected as recording medium and examples of recorded tracks and tracking signals are shown, and FIG. 3 is an operational waveform diagram of the system of FIG. 1.

In FIG. 1, a pair of heads 1a and 1b are installed on a rotary cylinder 1. A magnetic tape 2 travels along the side of the rotary cylinder 1 so as to pass over the heads 1a and 1b. A synchronizing signal detection circuit 8 detects a synchronizing signal recorded on the magnetic tape from the output of the head 1a or 1b. An amplitude detection circuit 11 detects the amplitude of a pilot signal used to detect the tracking position of the head from the output of the head 1a or 1b. A capacitor 12 is connected in series to the output terminal of the amplitude detection circuit 11. A voltage source 14 generates a fixed voltage. A switching circuit 13 is connected between the capacitor 12 and the voltage source 14. A switching control circuit 10 receives an output signal of the synchronizing signal detection circuit 8 and controls the turning on and off of the switching circuit 13. A timing circuit 9 receives the output signal of the synchronizing signal detection circuit 8 and generates a pulse after a predetermined time. A sample/hold circuit 15 samples and holds a voltage at the connection point of the capacitor 12 and the switching circuit 13 in response to the pulse outputted from the timing circuit 9.

A frequency generator (hereafter called an FG) 4 outputs a frequency signal whose frequency is proportional to the rotational speed of a capstan motor 3 which causes the magnetic tape to travel. A speed control circuit 5 generates a signal to cause the capstan motor 3 to rotate at a constant speed from the output signal of FG 4. A driving circuit 7 receives the output signal of the speed control circuit 5 via an adder 6 and supplies a driving current to the capstan motor 3. The adder 6 adds output signals of the sample/hold circuit 15 and the speed control circuit 5. The capstan motor 3, FG 4, speed control circuit 5, adder 6, and driving circuit 7 constitute a driving unit 16 which causes the magnetic tape to travel at a constant speed.

The operation of the system in FIG. 1 will be described as follows.

FIG. 2(A) shows an example of a position where the tracking signal to detect the tracking position of the head is recorded, and FIG. 2(B) shows an example of concrete recording pattern of each tracking signal.

In FIG. 2(A), each of two areas 22a and 22b in each track formed on the magnetic tape 2 is the area where the tracking signal is recorded. As can be seen from the diagram, the tracking signal is recorded at a prescribed position on each track.

FIG. 2(B) shows an enlarged portion of the tracking signal recording area 22a or 22b. In FIG. 2(B), in each of the shaded areas 26a and 26b a pilot signal used for the detection of tracking is recording. The pilot signal has a low frequency so as to be less attenuated due to crosstalk. The pilot signals recorded in the areas 26a and 26b are the same in frequency and different from each other in azimuth angle. In each of the shaded areas 24a and 24b, a synchronizing signal is recorded at the same azimuth angle as the pilot signal in 26b to detect the pilot signal of the adjacent track on the right-hand side with respect to the head advancing direction 23. In each of the shaded areas 25a and 25b, a synchronizing signal is recorded at the same azimuth angle as the pilot signal in 26a to detect the pilot signal of the adjacent track on the right-hand side with respect to the head advancing direction 23. In FIG. 2(B), the signals of the same frequency is recorded in the same direction shaded areas. Reference numeral 29 represents a head gap which moves in the direction shown by an arrow 23. The synchronizing signal has a high frequency causing large azimuth loss so that the synchronizing signals of the adjacent tracks are not detected.

The following describes a case wherein the magnetic tape shown in FIGS. 2(A) and 2(B) is used in the system shown in FIG. 1. In case the head gap 29 moves in the direction 23 shown in FIG. 2(B), the pilot signals recorded in areas 26b, 26a and 26c are reproduced in turn, and the reproduced signals become as shown in FIG. 3(a). Because the width of the head gap 19 is wider than the width of the recorded track 21b, the pilot signals on the two adjacent tracks 21a and 21c can be reproduced as crosstalk signals. The signal shown in FIG. 3(a) has three kinds of amplitude levels: the signal A1 of a large amplitude is the pilot signal from area 26b on the track 21b where the head gap 29 is scanning, and the signals A2 and A3 of small amplitudes are crosstalks of the pilot signals recorded respectively in areas 26a and 26c on the tracks 21a and 21c on the right-hand side and left-hand side of the track 21b. The crosstalks from the both adjacent tracks are proportional to the parts of the head gap 29 overlapping the adjacent tracks. Therefore, among the signals shown in FIG. 3(a), signals A2 and A3 represent the amounts of extensions of the head gap toward the adjacent track 21a at right and track 21c at left. The portion of the signal A1 is not necessary to detect the relative position of the head to the track.

The amplitudes of the signals shown in FIG. 3(a) are detected by the amplitude detection circuit 11 as shown in FIG. 3(b).

Also, the synchronizing signal in area 24a is reproduced by the head gap 29 in synchronization with the last half part of the pilot signal recorded in area 26a on the adjacent track 21a. Therefore, as shown in FIG. 3(c), the synchronizing signal reproduced from area 24a becomes a signal which is synchronized with the latter half part of the second reproduced pilot signal A2 shown in FIG. 3(a). The synchronizing signal detection circuit 8 detects the signal of FIG. 3(c) and outputs a signal shown in FIG. 3(d). In response to the leading edge of the signal of FIG. 3(d), the switching control circuit 10 generates a pulse signal(first pulse signal) as shown in FIG. 3(e). The switching control circuit 10 may be configured by a differentiation circuit. The leading edge of the first pulse signal (e) is located at the center of the duration of the second signal A2 shown in FIG. 3(a). With reference to FIG. 2(B), the first pulse signal of FIG. 3(e) is generated when the head gap 29 has reached the position shown by an arrow 27.

The timing circuit 9 receives the signal of FIG. 3(d) and generates a pulse signal (second pulse signal) as shown in FIG. 3(f) which is delayed by a time Td from the leading edge of the signal shown in FIG. 3(d). The delay time Td is set so that the leading edge of the second pulse signal (f) is located at the center of the third signal A3 shown in FIG. 3(a). Referring to FIG. 2(B), the second pulse signal (f) is generated when the head gap 29 has come to the position shown by an arrow 28.

That is to say, the two pulse signals (e) and (f) are generated when the head gap 29 is reproducing the pilot signals of the adjacent tracks 21a and 21c, respectively.

Suppose that the levels of the signals A2 and A3 shown in FIG. 3(b) (that is, the amplitudes of the pilot signals) are $V_1$ and $V_2$ when the two pulse signals (e) and (f) are generated, and that the fixed voltage generated by the voltage source 14 is Vs. The switching circuit 13 is temporarily closed by the first pulse signal (e), when a voltage Vc stored in the capacitor 12 is expressed by the following formula.

$$Vc = V_1 - Vs$$

The switching circuit 13 has been opened before the timing circuit 9 generates the second pulse signal (f), and if the voltage appearing at the connection point of the capacitor 12 and the switching circuit 13 is assumed to be Vo, then Vo is expressed by the following formula.

$$\begin{aligned} Vo &= V_2 - Vc \\ &= V_2 - (V_1 - Vs) \\ &= (V_2 - V_1) + Vs \end{aligned}$$

This voltage Vo is sampled and held by the sample/hold circuit 15 in response to the second pulse signal (f) from the timing circuit 9.

Since the voltages $V_1$ and $V_2$ are proportional to the amounts of extensions of the head gap toward the tracks respectively adjacent at the right side and left side, the difference $(V_2 - V_1)$ represents a tracking error of the head. Therefore, it is known that the voltage Vo which is proportional to the difference $(V_2 - V_1)$ can be used as a tracking error signal.

The above operation is quite the same when the head gap 29 passes other tracks. Although there is a difference in the recording length of the synchronizing signal, its starting point relative to the adjacent pilot signal recorded area is fixed, so that the above-described operation is secured.

The driving unit 16 causes the magnetic tape 2 to travel at the constant speed as that of recording when the output Vo of the sample/hold circuit 15 is equal to Vs. When the value of $(V_2 - V_1)$ is not zero, i.e., a tracking error is caused, the driving unit 16 changes the traveling speed of the magnetic tape so that the voltage Vo becomes Vs.

Incidentally, in the system shown in FIG. 1, the detection circuit which is composed of the synchronizing signal detection circuit 8, timing circuit 9, switching control circuit 10., amplitude detection circuit 11, capacitor 12, switching circuit 13, voltage source 14 and sample/hold circuit 15 can be generally used to detect an amplitude change of any such a signal that includes a synchronizing signal and changes in amplitude within a prescribed time after an occurrence of the synchronizing signal.

Figure 4:
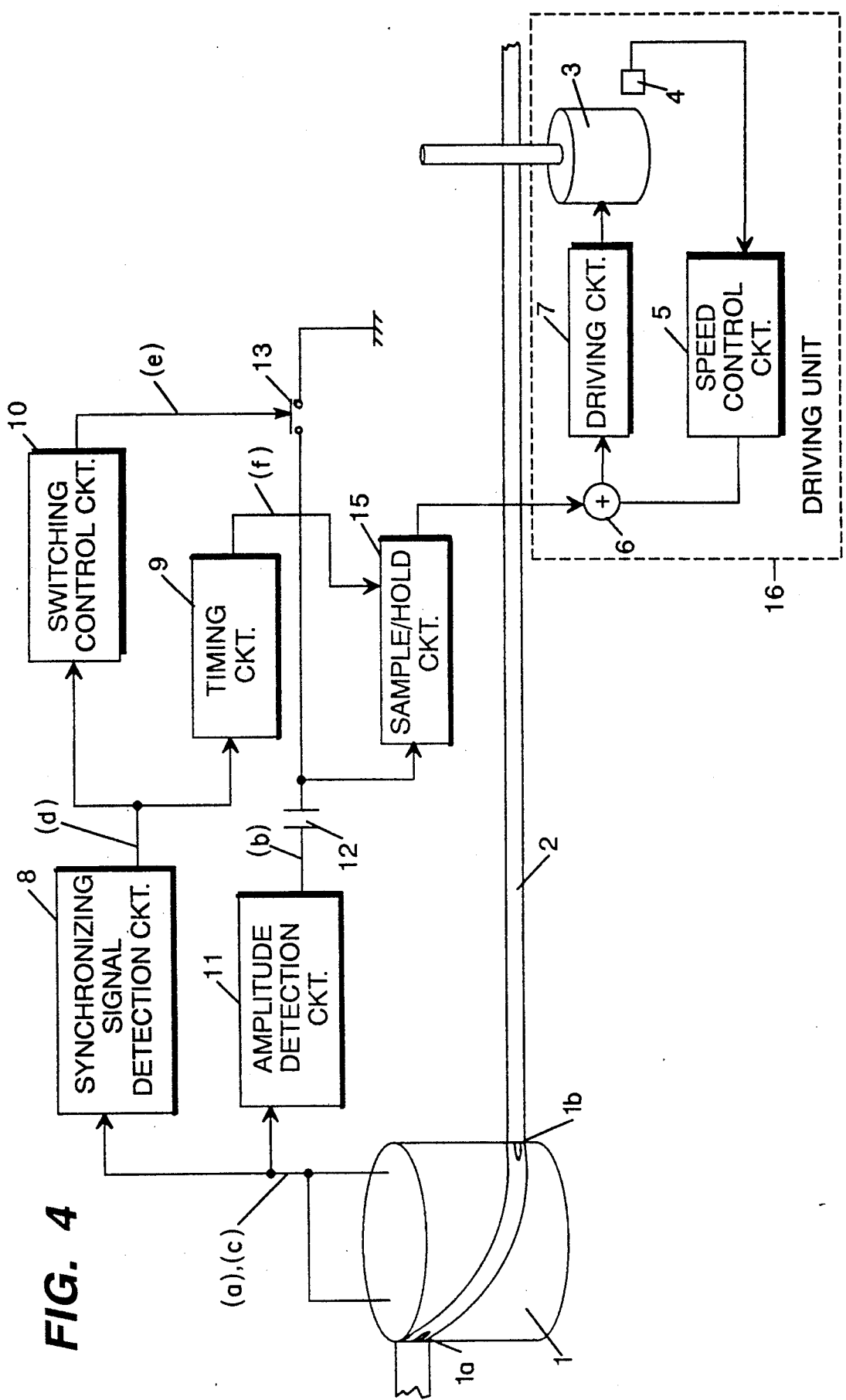
FIG. 4 is a block diagram of a second embodiment according to the present invention.

The fixed voltage Vs may be 0, that is, the voltage source 14 in the system of FIG. 1 may be removed and the terminal of the switching circuit 14 connected to the voltage source 14 in FIG. 1 may be connected to the ground. FIG. 4 shows a system modified as such. It is apparent from the foregoing description that the voltage Vc stored in the capacitor 12 when the switch circuit 13 is closed by the first sample pulse signal of FIG. 3(e) becomes $Vc = V_1$, and that the voltage Vo sampled and held by the sample/hold circuit 15 in response to the second sample pulse signal of FIG. 3(f) becomes $Vo = V_2 - V_1$. The driving unit 16 operates so as to allow the voltage Vo to become $Vo = 0$.

Figure 5:
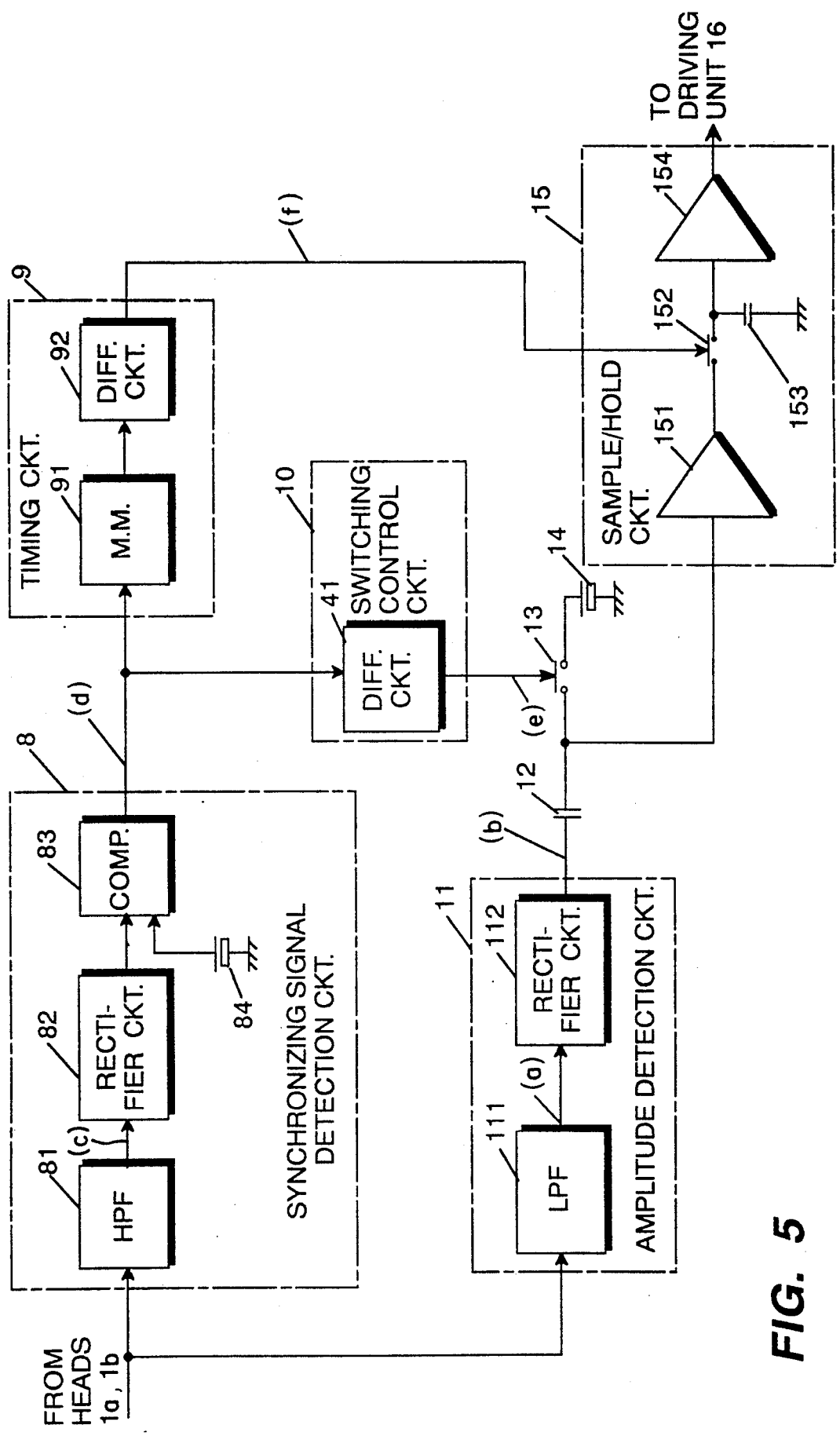
FIG. 5 is a block diagram of a third embodiment according to the present invention.

FIG. 5 shows a third embodiment according to the present invention, in which only the essential circuitry portions are shown for simplicity.

In FIG. 5, the synchronizing signal detection circuit 8 is composed of a high-pass filter 81, a rectifier circuit 82, comparator 83, and a reference voltage source 84. The amplitude detection circuit 11 is composed of a low-pass filter 111, and a rectifier circuit 112. The timing circuit 9 is composed of a monostable multivibrator 91, and a differentiation circuit 92. The switching control circuit 10 is composed of a differentiation circuit 41. The sample/hold circuit 15 is composed of voltage followers 151 and 154, a switching circuit 152, and a hold capacitor 153.

The recording medium used is a magnetic tape shown in FIGS. 2(A) and 2(B) and the operational waveform diagram is equal to that shown in FIG. 3, and therefore, operation thereof will be described by using FIGS. 2(A) and 2(B) and FIG. 3.

The high-pass filter 81 in the synchronizing signal detection circuit 8 separates the synchronizing signal from the signal reproduced by the head 1a or 1b. Such separated signal is shown in FIG. 3(c). The output of the high-pass filter is rectified by the rectifier circuit 82 and compared by the comparator 83 with a reference voltage generated by the voltage source 84. As a result of the comparison, if the amplitude of the synchronized signal of FIG. 3(c) is greater than the reference voltage, the output of the comparator 83 becomes high level. Because the reference voltage of the voltage source 84 is set to a value which is capable of detecting the synchronizing signal, the output of the comparator 83 becomes a pulse signal which is a high level only while the synchronizing signal is being detected, as shown in FIG. 3(d).

The output of the comparator 83 is differentiated by the differentiation circuit 41 to obtain the first pulse as shown in FIG. 3(e). The monostable multivibrator 91 in the timing circuit 9 outputs a pulse of a predetermined pulse width Td immediately after it received the output from the comparator 83, and the differentiation circuit 92 differentiates the trailing edge of the output pulse of the monostable multivibrator 91 to obtain the second pulse as shown in FIG. 3(f).

On the other hand, the pilot signals are separated from the output signal of the head 1a or 1b by the low-pass filter 111 as shown in FIG. 3(a). The signals in FIG. 3(a) are rectified by the rectifier circuit 112 to form the waveform as shown in FIG. 3(b). The switching circuit 152 in the sample/hold circuit 15 turns on only when the second pulse of FIG. 3(f) is applied thereto, when the voltage inputted into the voltage follower 151 is stored in the hold capacitor 153. Because the voltage follower 154 outputs the voltage stored in the hold capacitor 153 as is, the sample/hold circuit 15 outputs the input voltage in response to the second pulse of FIG. 3(f). Then, the sample/hold circuit 15 holds the output voltage until the differentiation circuit 92 outputs a second pulse.

As described above, the system shown in FIG. 5, that is, the synchronizing signal detection circuit 8, timing circuit 9, amplitude detection circuit 11, sample/hold circuit 15, and switching control circuit 10 (in FIG. 5, it is the differentiation circuit 41) accomplish quite the same operations as those of the embodiment of FIG. 1.

Therefore, in the embodiment shown in FIG. 5, it is possible to securely accomplish the tracking of the head during reproduction in the same manner as that of the embodiment shown in FIG. 1.

Figure 6:
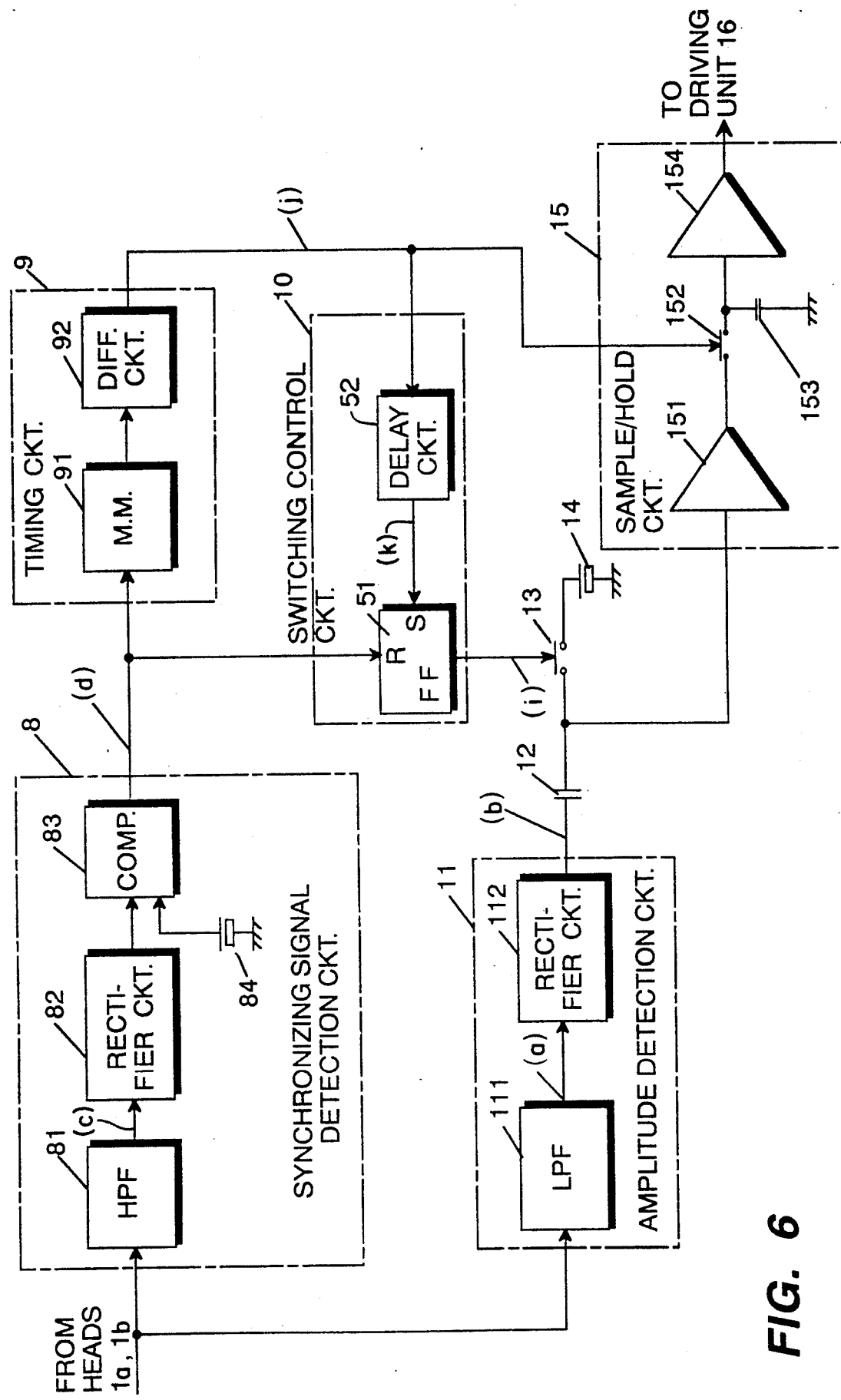
FIG. 6 is a block diagram of a fourth embodiment according to the present invention.
Figure 7:
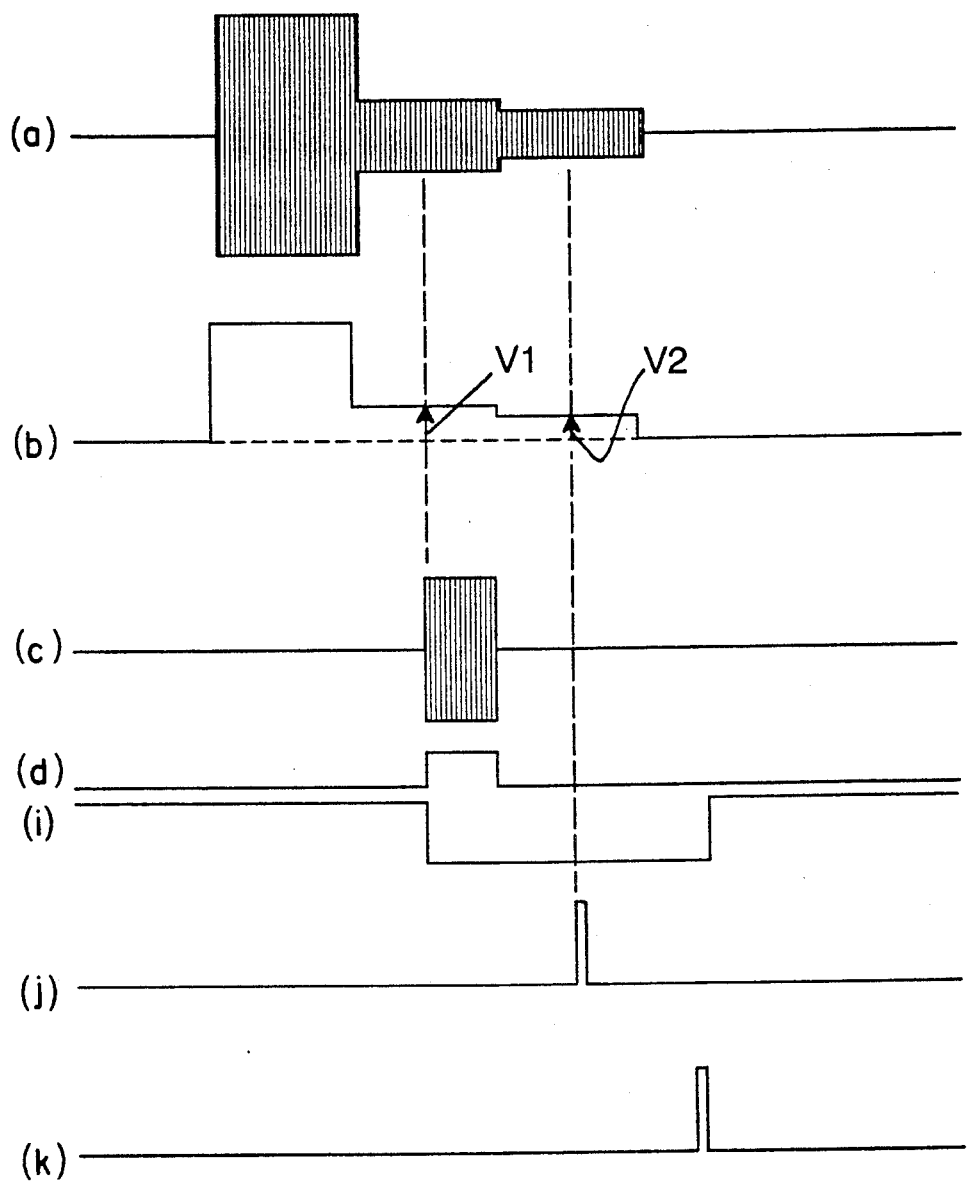
FIG. 7, parts $(a)$-$(d)$ and $(i)$-$(k)$, is an operational waveform diagram of the fourth embodiment.

FIG. 6 shows a fourth embodiment according to the present invention, and FIG. 7 is an operational waveform diagram thereof. In much the same way as FIG. 5, FIG. 6 shows only the essential circuitry portion and the same portions shown in FIG. 1 have been omitted for simplicity.

The system shown in FIG. 6 is the same as that of FIG. 5 except for the switching control circuit 10. The system in FIG. 6 uses a magnetic tape shown in FIGS. 2(A) and 2(B), and operation thereof will be described with reference to FIG. 2(A) and 2(B) and FIG. 7.

The synchronizing signal detection circuit 8 operates in the same manner as that of FIG. 5. That is to say, the high-pass filter 81 separates the synchronizing signal from the signal reproduced by the head 1a or 1b. The separated synchronizing signal is shown in FIG. 7(c). The output of the low-pass filter 81 is rectified by the rectifier circuit 82 and is compared by the comparator 83 with the reference voltage generated by the voltage source 84. As a result of this, if the amplitude of the synchronizing signal of FIG. 7(c) is greater than the reference voltage, the output of the comparator becomes high level. Because the reference voltage of the voltage source 84 is set to a value which is capable of detecting the synchronizing signal, the output of the comparator 83 becomes a pulse signal which is a high level only while the synchronizing signal is being reproduced, as shown in FIG. 7(d).

On the other hand, the pilot signals are separated from the output signal of the head 1a or 1b by the low-pass filter 111 to be the signals shown in FIG. 7(a). The rectifier circuit 112 rectifies the output signal of the low-pass filter 111 to obtain the signals as shown in FIG. 7(b).

The monostable multivibrator 91 in the timing circuit 9 outputs a pulse of a predetermined pulse width immediately after it received the output of the comparator 83, and the differentiation circuit 92 differentiates the trailing edge of the output pulse of the monostable multivibrator 91 to obtain a pulse as shown in FIG. 7(j). That is to say, the monostable multivibrator 91 outputs the pulse having a width which corresponds to the time between the center of the second signal and the center of the third signal of the signals shown in FIG. 7(a).

A delay circuit 52 in the switching control circuit 10 causes the output pulse of the timing circuit 9 to be delayed by a prescribed time to obtain a pulse signal as shown in FIG. 7(k). The flip-flop 51 is set by the output pulse (FIG. 7(k)) of the delay circuit 52 and reset by the output pulse (FIG. 7(d)) of the synchronizing signal detection circuit 8. Therefore, the output of the flip-flop 51 becomes as shown in FIG. 7(i).

Suppose that the amplitude of the pilot signal at the rising edge of the signal shown in FIG. 7(d) and the amplitude of the pilot signal when the pulse signal of FIG. 7(j) is generated are respectively $V_1$ and $V_2$ and the output voltage of the voltage source 14 is Vs.

The switching circuit 13 is closed when the output of the flip-flop 51 is at a high level. When the output of the flip-flop 51 becomes low and thus the switching circuit 13 is turned off, the voltage Vc stored in the capacitor 12 is expressed by the following formula.

$$Vc = V_1 - Vs$$

When the timing circuit 9 generates the pulse shown in FIG. 7(j), the voltage Vo appearing at the connection point of the capacitor 12 and the switching circuit 13 is expressed by the following formula.

$$\begin{aligned} Vo &= V_2 - Vc \\ &= (V_2 - V_1) + Vs \end{aligned}$$

The switching circuit 152 in the sample/hold circuit 15 turns on only when the pulse of FIG. 7(j) is applied thereto, during when the input voltage inputted into the voltage follower 151 is stored in the hold capacitor 153. Because the voltage follower 154 outputs the voltage stored in the hold capacitor 153 as is, the sample/hold circuit 15 outputs the input voltage when the pulse of FIG. 7(j) is applied thereto. Then, the sample/hold circuit 15 holds the output voltage until the differentiation circuit 92 outputs a next pulse.

Therefore, the system in FIG. 6 can obtain the voltage Vo which represents a tracking error.

In the embodiments described above represent examples wherein the synchronizing signal is selected so as to synchronize with the pilot signal to be first reproduced, but it is also possible to produce sample pulses based on a synchronizing signal which is reproduced earlier than the first reproduced pilot signal.

Furthermore, the present invention is also effective to an apparatus which controls a head position by detecting the crosstalk from the adjoining track, for example, to an apparatus which has a light detecting type pickup such as a CD player. In the case of an apparatus such as a CD player, what accomplishes the head tracking is the traverse feeding mechanism for moving the pickup head in the radial direction of a recording disc.

What is claimed is:

1. A tracking control system for controlling tracking of a pickup head in an information reproducing apparatus employing a recording medium which has recorded therein a pilot signal and a synchronizing signal for detecting the pilot signal, the pilot signal changing in amplitude when reproduced by said pickup head when said pickup head is not correctly tracing a center of a track formed on the recording medium, said system comprising:

a synchronizing signal detection circuit for detecting said synchronization signal from an output signal of said pickup head;

an amplitude detecting circuit for detecting an amplitude of said pilot signal from the output signal of said pickup had, the detected amplitude appearing at an output terminal of said amplitude detecting circuit;

a capacitor which is connected at one terminal thereof to the output terminal of said amplitude detecting circuit;

a switching circuit which is connected at one terminal thereof to the other terminal of said capacitor, the other terminal of said switching circuit being fixed at a fixed electrical potential;

a switching control circuit responsive to the synchronizing signal detected by the synchronizing signal detection circuit for producing a first pulse signal for controlling said switching circuit so that a voltage difference between an amplitude of the pilot signal appearing at that time at the output terminal of said amplitude detecting circuit and said fixed electrical potential is stored in said capacitor;

a timing circuit for producing a second pulse signal which is delayed by a predetermined time from a leading edge of said first pulse signal;

a sample and hold circuit for sampling and holding a voltage appearing at the terminal of said capacitor connected to the switching circuit in response to said second pulse signal; and a tracking means for controlling a position of said pickup head relative to said recording medium according to an output signal of said sample and hole circuit so that said pickup head traces correctly the center of the track.

2. A tracking control system as in claim 1, wherein said switching control circuit produces as said first pulse signal an impulse signal, and wherein said switching circuit is temporarily closed in response only to said impulse signal.

3. A tracking control system as in claim 1, wherein said switching control circuit produces as said first pulse signal a pulse signal whose duration is longer than said predetermined time, and wherein said switching circuit is opened only during the duration of said first pulse signal.

4. A tracking control system as in claim 1, wherein said fixed electrical potential is zero.

5. A tracking control system for controlling tracking of a magnetic head in an information reproducing apparatus employing as a recording medium a magnetic tape which has recorded therein a pilot signal and a synchronizing signal for detecting the pilot signal, the pilot signal changing in amplitude when reproduced by said magnetic head when said magnetic head is not correctly tracing a center of a track formed on the magnetic tape, said system comprising:

a means for driving said magnetic tape;

a synchronizing signal detection circuit for detecting said synchronizing signal from an output signal of said magnetic head;

an amplitude detecting circuit for detecting an amplitude of said pilot signal from the output signal of said magnetic head, the detected amplitude appearing at an output terminal of said amplitude detecting circuit;

a capacitor which is connected at one terminal thereof to the output terminal of said amplitude detecting circuit;

a switching circuit which is connected at one terminal thereof to the other terminal of said capacitor, the other terminal of said switching circuit being fixed at a fixed electrical potential;

a switching control circuit responsive to the synchronizing signal detected by the synchronizing signal detection circuit for producing a first pulse signal for controlling said switching circuit so that a voltage difference between an amplitude of the pilot signal appearing at that time at the output terminal of said amplitude detecting circuit and said fixed electric potential is stored in said capacitor;

a timing circuit for producing a second pulse signal which is delayed by a predetermined time from a leading edge of said first pulse signal;

a sample and hold circuit for sampling and holding a voltage appearing at the terminal of said capacitor connected to the switching circuit in response to said second pulse signal; and a tracking means for controlling said magnetic tape driving means according to an output signal of said sample and hold circuit so that said magnetic head traces correctly the center of the track.

6. A tracking control circuit system as in claim 5, wherein said switching control circuit produces as said first pulse signal an impulse signal, and wherein said switching circuit is temporarily closed in response only to said impulse signal.

7. A tracking control system as in claim 5, wherein said switching control circuit produces as said first pulse signal a pulse signal whose duration is longer than said predetermined time, and wherein said switching circuit is opened only during the duration of said first pulse signal.

8. A tracking control system as in claim 5, wherein said fixed electrical potential is zero.

9. A detection circuit for detecting an amplitude change of a signal which contains therein a synchronizing signal, comprising:

a synchronizing signal detection circuit for detecting said synchronizing signal;

an amplitude detecting circuit for detecting an amplitude of said signal, the detected amplitude appearing at an output terminal of said amplitude detecting circuit;

a capacitor which is connected at one terminal thereof to the output terminal of said amplitude detecting circuit;

a switching circuit which is connected at one terminal thereof to the other terminal of said capacitor, the other terminal of said switching circuit being fixed at a fixed electrical potential;

a switching control circuit responsive to the synchronizing signal detected by the synchronizing signal detection circuit for producing a first pulse signal for controlling said switching circuit so that a voltage difference between an amplitude of said signal appearing at that time at the output terminal of said amplitude detecting circuit and said fixed electric potential is stored in said capacitor;

a timing circuit for producing a second pulse signal which is delayed by a predetermined time from a leading edge of said first pulse signal;

a sample and hold circuit for sampling and holding a voltage appearing at the terminal of said capacitor connected to the switching circuit in response to said second pulse signal.

10. A detection circuit as in claim 9, wherein said switching control circuit produces as said first pulse signal an impulse signal, and wherein said switching circuit is temporarily closed in response only to said impulse signal.

11. A detection circuit as in claim 9, wherein said switching control circuit produces as said first pulse signal a pulse signal whose duration is longer than said predetermined time, and wherein said switching circuit is opened only during the duration of said first pulse signal.

12. A detection circuit as in claim 9, wherein said fixed electrical potential is zero.

* * * * *